(12) United States Patent
Lin et al.

(10) Patent No.: US 9,204,426 B2
(45) Date of Patent: Dec. 1, 2015

(54) METHOD AND DEVICE FOR CONFIGURING UPLINK CONTROL CHANNEL RESOURCE

(75) Inventors: Yanan Lin, Beijing (CN); Tingting Liu, Beijing (CN); Xueming Pan, Beijing (CN); Zukang Shen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 799 days.

(21) Appl. No.: 13/504,956

(22) PCT Filed: Nov. 3, 2010

(86) PCT No.: PCT/CN2010/001770
§ 371 (c)(1),
(2), (4) Date: Jul. 17, 2012

(87) PCT Pub. No.: WO2011/054188
PCT Pub. Date: May 12, 2011

(65) Prior Publication Data
US 2013/0128826 A1 May 23, 2013

(30) Foreign Application Priority Data

Nov. 3, 2009 (CN) .......................... 2009 1 0237069

(51) Int. Cl.
*H04W 72/04* (2009.01)
*H04L 1/18* (2006.01)
(Continued)

(52) U.S. Cl.
CPC ............ *H04W 72/04* (2013.01); *H04L 1/1861* (2013.01); *H04L 5/0023* (2013.01);
(Continued)

(58) Field of Classification Search
None
See application file for complete search history.

(56) References Cited

U.S. PATENT DOCUMENTS 7,499,439 B2 * 3/2009 Li et al. .......................... 370/338
7,583,745 B2 * 9/2009 Pasanen et al. ................ 375/267
(Continued)

FOREIGN PATENT DOCUMENTS

CN 101114868 A 1/2008
CN 101227231 A 7/2008
(Continued)

OTHER PUBLICATIONS

U.S. Appl. No. 61/218,782, filed Jun. 19, 2009, Shin et al., "Method for High Volume Uplink Control Information Signaling in LTE-A".*
(Continued)

*Primary Examiner* — Gregory Sefcheck
(74) *Attorney, Agent, or Firm* — Kilpatrick Townsend & Stockton LLP

(57) ABSTRACT

Disclosed are a method and an apparatus for uplink control channel resource configuration. A base station allocates an uplink control channel resource set, and the resource set includes channel resource elements which can be used by acknowledgement/negative acknowledgement ACK/NACK feedback. The base station sends a configuration signaling to a user terminal according to the channel resource elements circumstances included in the uplink control channel resource set and/or that if the uplink control channel resources to be fed back corresponding to a downlink sub-frame control district Control Channel Element CCE can satisfy all of the antenna ports to process transmission diversity. The user terminal configured with two antenna ports uses the corresponding channel resources to process ACK/NACK feedback according to the configuration signaling. Applying the method, apparatus and system provided by the present invention can solve the problems that the limited feedback channel resources affect the flexibility of Physical Downlink Shared Channel PDCCH scheduling and the complexity of blind tests the user terminal processes for PDCCH.

14 Claims, 6 Drawing Sheets

(51) Int. Cl.
*H04L 5/00* (2006.01)
*H04L 1/06* (2006.01)
*H04W 72/02* (2009.01)
*H04W 72/12* (2009.01)

(52) U.S. Cl.
CPC ........... *H04L 5/0053* (2013.01); *H04L 5/0055* (2013.01); *H04L 5/0094* (2013.01); *H04L 1/06* (2013.01); *H04W 72/02* (2013.01); *H04W 72/042* (2013.01); *H04W 72/12* (2013.01)

(56) References Cited

U.S. PATENT DOCUMENTS

| | | | | |
|---|---|---|---|---|
| 8,171,372 | B2 * | 5/2012 | Pan | 714/758 |
| 8,467,367 | B2 * | 6/2013 | Malladi et al. | 370/343 |
| 8,483,698 | B2 * | 7/2013 | Papasakellariou et al. | 455/450 |
| 8,503,425 | B2 * | 8/2013 | Chung et al. | 370/349 |
| 8,676,133 | B2 * | 3/2014 | Montojo et al. | 455/82 |
| 2008/0165697 | A1 | 7/2008 | Zeira et al. | |
| 2009/0006925 | A1 * | 1/2009 | Pan | 714/758 |
| 2011/0141928 | A1 * | 6/2011 | Shin et al. | 370/252 |
| 2011/0158351 | A1 * | 6/2011 | Gorokhov et al. | 375/316 |
| 2011/0170489 | A1 * | 7/2011 | Han et al. | 370/328 |
| 2012/0307928 | A1 * | 12/2012 | Jia et al. | 375/267 |

FOREIGN PATENT DOCUMENTS

| | | |
|---|---|---|
| CN | 101541063 A | 9/2009 |
| KR | 2009-0111271 A | 10/2009 |
| WO | 2009/131345 A1 | 10/2009 |

OTHER PUBLICATIONS

U.S. Appl. No. 61/220,017, filed Jun. 24, 2009, Shin et al., "Method for Signaling Uplink Control Information in LTE-A".*

* cited by examiner

--Prior Art--

--Prior Art--

--Prior Art--

METHOD AND DEVICE FOR CONFIGURING UPLINK CONTROL CHANNEL RESOURCE

This application is a U.S. National Stage of International Application No. PCT/CN2010/001770, filed on Nov. 3, 2010, designating the United States, and claims claiming priority to Chinese Patent Application No. 200910237069.5, filed with the State Intellectual Property Office of China on Nov. 3, 2009 and entitled "Method, Device and System for Configuring Uplink Control Channel Resource", the disclosures of both of which are hereby incorporated by reference in their entirety.

FIELD OF THE INVENTION

The present invention relates to the field of radio communications and particularly to a method and device for configuring an uplink control channel resource.

BACKGROUND OF THE INVENTION

A Hybrid Automatic Repeat reQuest (HARQ) is adopted in a long term evolution system to improve the reliability of data transmission, and when the downlink HARQ function is enabled, a user equipment decodes a received downlink data packet and feeds back acknowledgement (ACK) to a base station if it is decoded correctly or feeds back non-acknowledgement (NACK) and requests the base station to retransmit the data packet if it fails to be decoded. At the end of a downlink persistent scheduling service, the base station transmits a Semi-Persistent Scheduling (SPS) resource release instruction to the user equipment to instruct the user equipment to release all the resources allocated to the service, and the user equipment feeds back ACK to the base station upon correct reception of the instruction. The user equipment will use an uplink control channel resource to transmit the ACK/NACK feedback information to the base station over the uplink control channel to thereby perform an HARQ process.

In a general transmission solution of the long term evolution system (Rel-8) which has been substantially established in the ongoing standardization effort, schematic diagrams of multi-carrier bandwidth allocation of a Frequency Division Duplexing (FDD) system and a Time Division Duplexing (TDD) system are as illustrated respectively in FIG. 1 and FIG. 2, where a downlink control signaling zone, a downlink data zone, an uplink control signaling zone and an uplink data zone and their transmission relationships with each other are defined respectively for each operating carrier. Particularly, uplink control signaling occupies both ends of a frequency band and is transmitted in a frequency-hopping mode, that is, the uplink control signaling will be transmitted over different frequency bands in two timeslots of a sub-frame.

For a dynamically scheduled downlink data packet, the index of an uplink control channel resource for its ACK/NACK feedback information will be derived from the index of a Control Channel Element (CCE) occupied by a Physical Downlink Control Channel (PDCCH) over which scheduling information of the data packet is borne, that is, a unique uplink channel resource index can be derived from a CCE index. In the LTE Rel-8 system, the user equipment transmits only one uplink control channel at most in each sub-frame due to the limit of single-carrier transmission in the uplink so that the actually used uplink control channel is an uplink control channel corresponding to a first CCE occupied by the downlink control channel of the user equipment.

In the ongoing study of an uplink control channel in the long term evolution system, it has been proposed to use Orthogonal Resource Transmit Diversity (ORTD) for transmit diversity in uplink control channel transmission performed by a user equipment configured with two or more transmission antenna ports, i.e., a user equipment with multiple transmission antenna ports, to thereby improve the reliability or capacity of transmitting uplink control signaling. The so-called ORTD refers to that each antenna port corresponds to an uplink control channel resource and the same information is transmitted via respective antenna ports after being spread by orthogonal sequences selected from resource indexes of the different antenna ports. A receiver picks out and then performs combined detection on signals from the different antenna ports to thereby achieve a diversity gain. FIG. 3 is a schematic principle diagram of transmit diversity in ORTD with two antenna ports, where s is fed-back ACK/NACK information, and $n_1^{PUCCH}$ and $n_2^{PUCCH}$ represent the indexes of two different uplink control channel resources over the two antenna ports respectively. The UE will feed back ACK/NACK information over the two feedback channels for transmit diversity of a PUCCH.

In the LTE Rel-8 system, for a user equipment, a Physical Downlink Control Channel (PDCCH) over which a Physical Downlink Shared Channel (PDSCH) corresponding to the user equipment is scheduled and also possibly a PDCCH over which a Physical Uplink Shared Channel (PUSCH) corresponding to the user equipment is scheduled exist in a downlink sub-frame to be fed back. The index of an uplink channel available when the user equipment feeds back ACK/NACK is determined from the index of a first CCE of a PDCCH over which a PDSCH of the user equipment is scheduled or an SPS resource is instructed to be released, and not all the CCEs of the PDCCH over which the PDSCH of the user equipment is scheduled have been used.

In a Long Term Evolution-Advanced (LTE-A) system, if transmit diversity of a Physical Uplink Control Channel (PUCCH) is to be supported for a user equipment configured with multiple transmission antenna ports, each of the antenna ports has to be configured with an uplink control channel resource, so it is required to limit the number of CCEs in a control zone, in a downlink sub-frame to be fed back, corresponding to the user equipment or to limit the aggregation level of CCEs of the PDCCH or to limit both of them, and this will influence the flexibility of PDCCH scheduling and the complexity of blind detection of the user equipment on the PDCCH.

SUMMARY OF THE INVENTION

Embodiments of the invention provide a method and device for configuring an uplink control channel resource to improve the flexibility of PDCCH scheduling and lower the complexity of blind detection on PDCCHs by a user equipment configured with multiple transmission antenna ports when transmit diversity of a PUCCH is supported for the user equipment in a long term evolution-advanced system.

A method for configuring an uplink control channel resource includes:

determining, by a base station, an uplink control channel resource over which a user equipment feeds back ACK/NACK; and transmitting, by the base station configuration signaling to the user equipment to indicate the uplink control channel resource over which the user equipment feeds back ACK/NACK, wherein the uplink control channel resource includes a channel resource in a set of uplink control channel resources and/or an uplink control channel resource corresponding to a CCE occupied by a downlink control channel to be fed back, and the set of uplink control channel resources includes one or more channel resource elements over which ACK/NACK can be fed back.

A method for configuring an uplink control channel resource includes:

receiving, by a user equipment, configuration signaling transmitted from a base station; and feeding back, by the user equipment, ACK/NACK over a corresponding channel resource according to the configuration signaling transmitted from the base station, wherein the configuration signaling is determined by the base station according to conditions of channel resource elements included in a preset set of uplink control channel resources and/or the number of uplink control channel resources corresponding to CCEs occupied by a downlink control channel to be fed back, and the set of uplink control channel resources includes one or more channel resource elements over which ACK/NACK can be fed back.

A device for configuring an uplink control channel resource includes:

an allocating module configured to determine an uplink control channel resource over which a user equipment feeds back ACK/NACK; and a transmitting module configured to transmit configuration signaling to the user equipment to indicate the uplink control channel resource over which the user equipment feeds back ACK/NACK, where the uplink control channel resource includes a channel resource in a set of uplink control channel resources and/or an uplink control channel resource corresponding to a CCE occupied by a downlink control channel to be fed back, and the set of uplink control channel resources includes one or more channel resource elements over which ACK/NACK can be fed back.

A device for configuring an uplink control channel resource includes:

a reading module configured to receive configuration signaling transmitted from a base station; and a feedback channel determining module configured to feed back ACK/NACK over a corresponding channel resource according to the configuration signaling transmitted from the base station, wherein the configuration signaling is determined by the base station according to conditions of channel resource elements included in a preset set of uplink control channel resources and/or the number of uplink control channel resources corresponding to CCEs occupied by a downlink control channel to be fed back, and the set of uplink control channel resources includes one or more channel resource elements over which ACK/NACK can be fed back.

For PUCCH transmission with transmit diversity, the technical solutions of the invention can remove the limitation on the aggregation level of CCEs of downlink control channels (PDCCHs) corresponding to a user equipment, can ensure the flexibility of and lower the complexity of a system while improving the reliability of the system due to a gain of transmit diversity and can be well compatible with an LTE Release 8 system.

DETAILED DESCRIPTION OF THE EMBODIMENTS

In a method and device for configuring an uplink control channel resource according to embodiments of the invention, when a user equipment configured with multiple antenna ports transmits an uplink control channel, a base station configures and transmits in high layer signaling to the user equipment a set of uplink control channel resources including channel resource elements over which ACK/NACK can be fed back, where each of the channel resource elements can be an uplink control channel resource or a group of uplink control channel resources, and in the latter case, the number of resources in the group shall be less than the number of antenna ports of the user equipment; the base station transmits configuration signaling according to conditions of the channel resource elements included in the set of uplink control channel resources and/or the number of uplink control channel resources corresponding to CCEs occupied by a downlink control channel in a downlink sub-frame to be fed back; and the user equipment configured with the multiple antenna ports feeds back ACK/NACK over the corresponding channel resources according to the configuration signaling.

The invention proposes a method for configuring an uplink control channel resource in dynamic indication combined with semi-static indication for compatibility with an LTE system.

For PUCCH transmission with transmit diversity, uplink control channel resources will be configured respectively for multiple antenna ports, and there are two methods dependent upon whether the downlink control channel in a downlink sub-frame to be fed back includes a PDCCH over which a PUSCH of the user equipment is scheduled.

The First Embodiment

Figure 1:
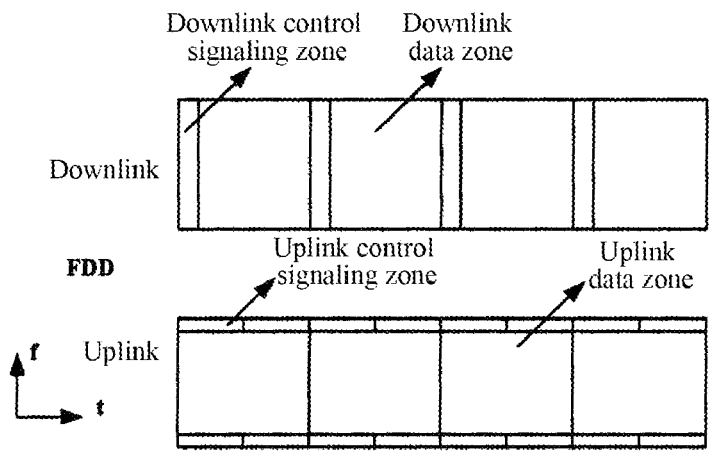
FIG. 1 and FIG. 2 are schematic diagrams of long term evolution multi-carrier bandwidth allocation in the prior art.
Figure 2:
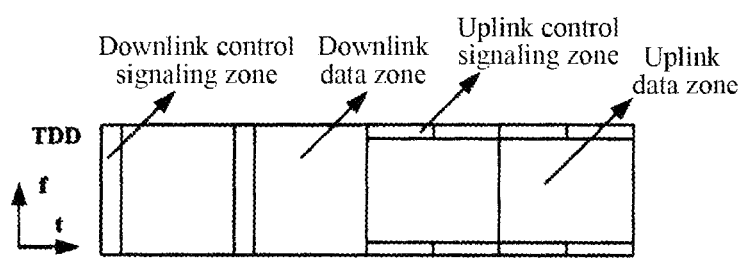
Figure 3:
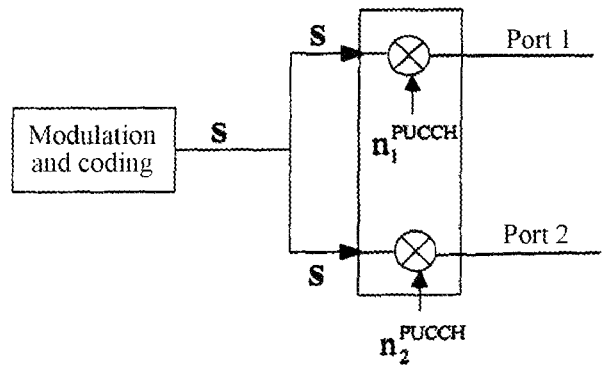
FIG. 3 is a schematic diagram of transmit diversity in ORTD with two antenna ports in the prior art.
Figure 4:
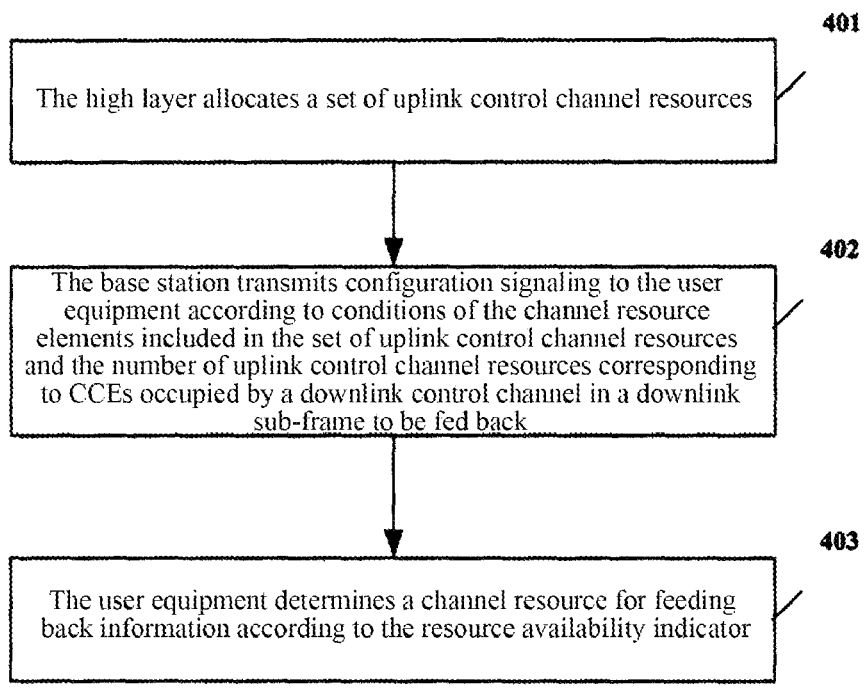
FIG. 4 is a flow chart of a method for configuring an uplink control channel resource according to an embodiment of the invention.

When the downlink control channel of a downlink sub-frame to be fed back does not include a PDCCH over which a PUSCH of the user equipment is scheduled and there are at least two resource elements of uplink control channel resources allocated to the user equipment from a set of uplink control channel resources, the method is as illustrated in FIG. 4 and includes the following steps.

In the step 401, the base station configures semi-statically and transmits in high layer signaling a set of uplink control channel resources to the user equipment.

Resources in the set of uplink control channel resources are semi-statically configured resources and can be configured in signaling.

There are a number N of resource elements in the set of uplink control channel resources, which correspond to a number N of channel resources or groups of channel resources over which ACK/NACK can be fed back, furthermore, a number N of channel resource indexes can be set in correspondence to the N resource elements to identify the N resource elements respectively, where N is an integer more than or equal to 1, and the indexes of the resource elements are transmitted in indication to save the transmission resources. A channel resource element in the set can be shared by a plurality of user equipments, and the base station schedules the user equipments to give a feedback with time division over the same channel resource to thereby avoid a problem of collision over the channel resource.

In the step 402, the base station determines an uplink control channel resource, over which the user equipment feeds back ACK/NACK, according to conditions of the channel resource elements included in the set of uplink control channel resources and the number of uplink control channel resources corresponding to CCEs occupied by a downlink control channel in a downlink sub-frame to be fed back, and transmits configuration signaling to the user equipment.

In particular, the configuration signaling can be transmitted as follows:

the base station sets a resource availability indicator in a PDCCH to indicate whether the user equipment feeds back ACK/NACK over a channel resource in the set of uplink control channel resources and the use conditions of the channel resource elements in the set of channel resources.

In particular, there are two scenarios of the resource availability indicator.

In a first scenario, if the number of uplink control channel resources, in an uplink sub-frame for feeding back ACK/NACK with transmit diversity, corresponding to CCEs occupied by the downlink control channel in a downlink sub-frame to be fed back is not less than the number of antenna ports used for transmit diversity (that is, the aggregation level of CCEs of the PDCCH, in the downlink sub-frame to be fed back, over which a PDSCH of the user equipment is scheduled or an SPS resource is instructed to be released, is more than or equal to the number of antenna ports), all the indexes of channel resources over which ACK/NACK is fed back via the multiple antenna ports are derived from the CCEs of the PDCCH with an aggregation level more than or equal to the number of antenna ports. In this case, it is not necessary to use any resource element in the high layer allocated set of uplink control channel resources; and the base station signals to the user equipment over the PDCCH that no channel resource element in the high layer allocated set is used (that is, the resource availability indicator indicates that the uplink control channel resources corresponding to the CCEs occupied by the downlink control channel are used for the multiple antenna ports when the user equipment feeds back ACK/NACK with transmit diversity). Taking the user equipment with two antenna ports as an example, the indexes of channel resources over which ACK/NACK is fed back via the two antenna ports are derived from the CCEs of the PDCCH with an aggregation level more than or equal to 2.

In a second scenario, if the number of uplink control channel resources, in an uplink sub-frame for feeding back ACK/NACK with transmit diversity, corresponding to CCEs occupied by the downlink control channel in a downlink sub-frame to be fed back is less than the number of antenna ports used for transmit diversity, that is, the aggregation level of CCEs of PDCCH, in the downlink sub-frame to be fed back, over which a PDSCH of the user equipment is scheduled or an SPS resource is instructed to be released, is less than the number of antenna ports used for transmit diversity, it is necessary to select some channel resource elements from the high layer allocated set of uplink control channel resources and to signal to the user equipment over the PDCCH the indexes of the channel resources to be used in the set for use by a preset number M of antenna ports, and feedback channels for the remaining antenna ports are determined from the channel resources corresponding to the PDCCH CCEs (i.e., as with the Rel-8), where M is more than or equal to 1 and less than the number of antenna ports. Taking the user equipment with two antenna ports as an example, a channel resource corresponding to a CCE of a PDCCH is used as a feedback channel for one of the two antenna ports (i.e., as with the Rel-8), and a feedback channel resource element will be selected from the high layer allocated set of uplink control channel resources as a feedback channel for the other antenna port. Taking the user equipment with three antenna ports as an example, M can be 1 or 2.

In the step 403, the user equipment reads the configuration signaling transmitted from the base station, detects the PDCCH of the downlink sub-frame to be fed back and determines from the resource availability indicator over the PDCCH whether to feed back ACK/NACK over a channel resource in the set of uplink control channel resources.

Furthermore, in the step 402, the base station signals the indexes of the channel resources to be used in the set to the user equipment over the PDCCH as follows:

the indexes of the channel resources in the set of uplink control channel resources used for a preset number M of antenna ports when the user equipment feeds back ACK/NACK with transmit diversity via the multiple antenna ports are added over the PDCCH, where M is more than or equal to 1.

The signaling indicator can be added in the PDCCH signaling by newly adding signaling of $\lceil \log_2(N+1) \rceil$ bits to all DCI formats borne over the PDCCH or by encoding the (N+1) signaling statuses jointly with other signaling in the existing Rel-8 DCI format or by even reusing the signaling in the existing DCI format to represent the (N+1) signaling statuses of the resource elements.

There are a number N of resource elements in the set of uplink control channel resources, where N is an integer more than or equal to 1, and this PDCCH signaling method (where the resource availability indicator is added over the PDCCH) can be performed by newly adding signaling of $\lceil \log_2(N+1) \rceil$ bits to all DCI formats borne over the PDCCH or by encoding the (N+1) signaling statuses jointly with other signaling in the existing Rel-8 DCI format or by even reusing the signaling in the existing DCI format to represent the (N+1) signaling statuses of the resource elements.

Among the (N+1) signaling statuses, there are a number N of statuses indicating the indexes of channel resources in the set of uplink control channel resources, over which the user equipment can feed back ACK/NACK, and the remaining one status indicating whether to feed back ACK/NACK over the uplink control channel resources corresponding to the CCEs occupied by the downlink control channel when the user equipment feeds back ACK/NACK with transmit diversity via the multiple antenna ports.

If the set of uplink control channel resources includes only one resource element, which is insufficient for the user equipment with the multiple antenna ports even if the resource element includes a group of resources, it is necessary to feed back with diversity over the uplink control channel resources corresponding to the CCEs occupied by the downlink control channel in the downlink sub-frame to be fed back, so the base station will not further signal separately to the user equipment over the PDCCH that the uplink control channel resources corresponding to the CCEs occupied by the downlink control channel in the downlink sub-frame to be fed back can be used, and the user equipment determines upon reception of only one resource element that the uplink control channel resources corresponding to the CCEs occupied by the downlink control channel in the downlink sub-frame to be fed back can be used. In this case, the base station will not further select an available resource element for the user equipment from the set of uplink control channel resources upon determining insufficiency of the uplink control channel resources corresponding to the CCEs occupied by the downlink control channel in the downlink sub-frame to be fed back.

Figure 5:
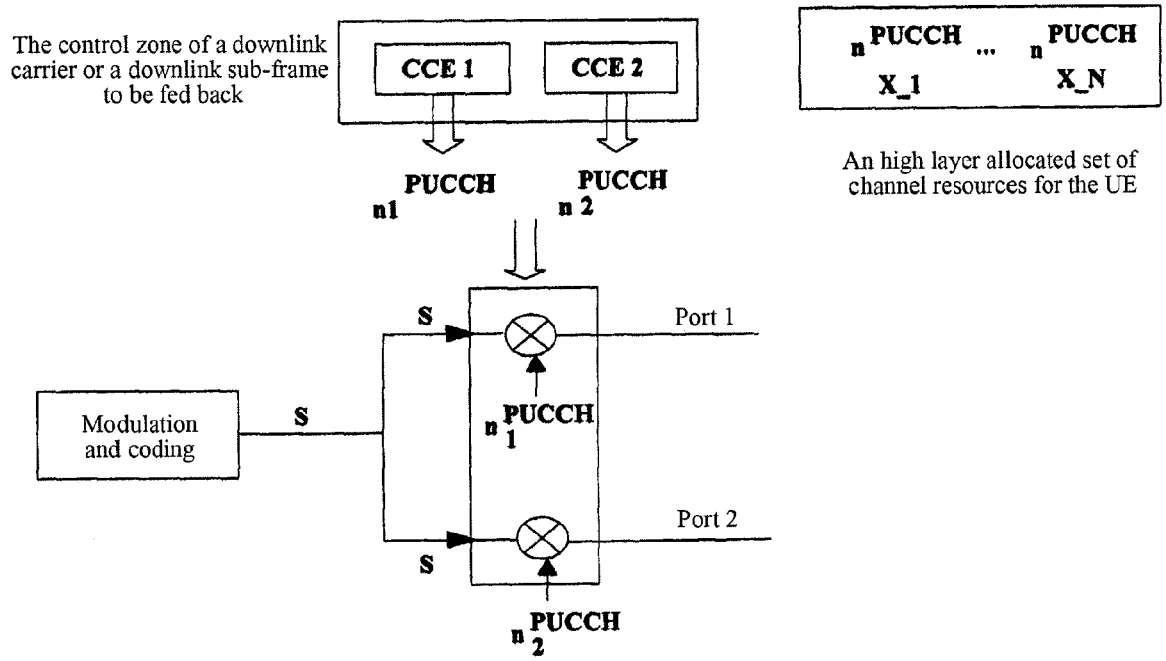
FIG. 5 is a schematic diagram of transmit diversity in ORTD with two antenna ports with a PDCCH aggregation level of 2 in a downlink sub-frame to be fed back according to an embodiment of the invention.

As illustrated in FIG. 5, for example, the aggregation level of PDCCH in a downlink sub-frame to be fed back is 2 with transmit diversity via two antenna ports, and then there are two CCEs corresponding respectively to two uplink control channel resources $n_1^{PUCCH}$ and $n_2^{PUCCH}$, which means that the uplink control channel resources corresponding to the CCEs occupied by the downlink control channel in the downlink sub-frame to be fed back are sufficient for transmit diversity via the two antenna ports. In this case, the base station signals to the user equipment over the PDCCH that no resource in the high layer allocated set of uplink control channel resources is used as a feedback channel. For example, if signaling of $\lceil \log_2(N+1) \rceil$ bits with N=7 is newly added to all DCI formats borne over the PDCCH, "000" can signal to the user equipment that no resource in the high layer allocated set of resources is used as a feedback channel over which feedback information is fed back to feed back ACK/NACK for a PDSCH over the downlink carrier. In this case, the user equipment uses the control channel resources $n_1^{PUCCH}$ and $n_2^{PUCCH}$ corresponding to the two CCEs of the PDCCH as feedback channels of ACK/NACK.

Figure 6:
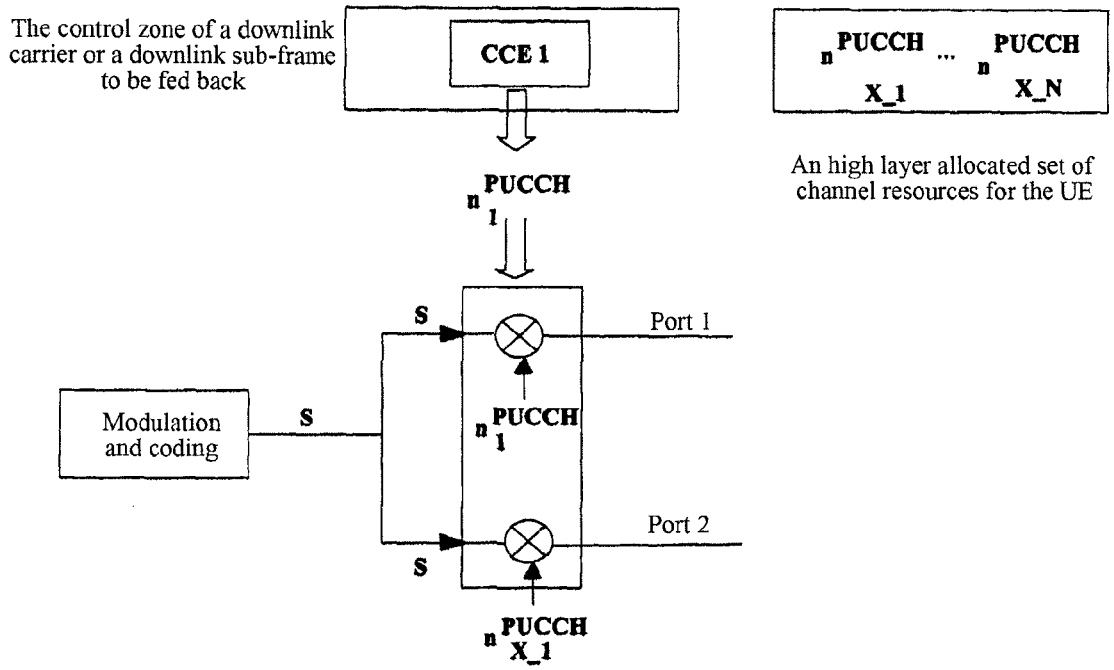
FIG. 6 is a schematic diagram of transmit diversity in ORTD with two antenna ports with a PDCCH aggregation level of 1 in a downlink sub-frame to be fed back according to an embodiment of the invention.

As illustrated in FIG. 6, the aggregation level of PDCCH in a downlink sub-frame to be fed back is 1 for transmission with transmit diversity via two antenna ports, and then there is only one CCE corresponding to a channel resource $n_1^{PUCCH}$ via one of the two antenna ports, which means that the uplink control channel resource corresponding to the CCE occupied by the downlink control channel in the downlink sub-frame to be fed back is insufficient for transmit diversity via the two antenna ports. In this case, a channel resource via the other antenna port will come from the high layer allocated set of channel resources for the user equipment. The base station allocates a resource index, e.g., $n_{X\_1}^{PUCCH}$, in all the elements of the set to the other antenna port of the user equipment and signals $n_{X\_1}^{PUCCH}$ for use to the user equipment over the PDCCH. For example, if signaling of $\lceil \log_2(N+1) \rceil$ bits with N=7 is newly added to all DCI formats borne over the PDCCH, "001" can signal to the user equipment that the first channel resource in the high layer allocated set of resources is used as a feedback channel over which feedback information is fed back to feed back ACK/NACK for a PDSCH over the downlink carrier.

In the method according to the first embodiment, when the set of uplink control channel resources includes only one resource element, the base station can transmit information (other than the index) of the only resource element to the user equipment without further signaling separately to the user equipment over the PDCCH that the uplink control channel resources corresponding to the CCEs occupied by the downlink control channel in the downlink sub-frame to be fed back can be used, and the processes corresponding to the step 402 and the step 403 of the method are as follows.

In the step 402, the base station transmits, to the user equipment, configuration signaling including information of all the resource elements in the set of uplink control channel resources, i.e., the information of the only one resource element.

In the step 403, the user equipment reads the configuration signaling transmitted from the base station, and if there is only one resource element in the set of uplink control channel resources in the configuration signaling, it detects the PDCCH of the downlink sub-frame to be fed back to determine whether the uplink control channel resources, in the uplink sub-frame for feeding back ACK/NACK with transmit diversity, corresponding to the CCEs occupied by the PDCCH in the downlink sub-frame to be fed back are sufficient for transmit diversity via the two antenna ports and determines from the result of detection whether to feed back ACK/NACK over the channel resources in the set of uplink control channel resources.

There are two scenarios of the step 403 as follows.

In a first scenario, if the base station determines from the PDCCH in the downlink sub-frame to be fed back that the uplink control channel resources, in the uplink sub-frame for feeding back ACK/NACK with transmit diversity, corresponding to the CCEs occupied by the PDCCH in the downlink sub-frame to be fed back are sufficient for transmit diversity via multiple antenna ports, it determines ACK/NACK feedbacks of the user equipment via the multiple antenna ports to be received over the uplink control resources corresponding to the CCEs of the control zone in the downlink sub-frame to be fed back. In this case, the base station signals to the user equipment over the PDCCH that no resource in the high layer allocated set of uplink control channel resources is used as a feedback channel; and the user equipment detects the PDCCH in the downlink sub-frame to be fed back to thereby determine that the uplink control channel resources, in the uplink sub-frame for feeding back ACK/NACK with transmit diversity, corresponding to the CCEs occupied by the PDCCH in the downlink sub-frame to be fed back are sufficient for transmit diversity via multiple antenna ports, and then the uplink control resources corresponding to the CCEs of the control zone in the downlink carrier or the downlink sub-frame to be fed back are used as feedback channels over which ACK/NACK is fed back via all the antenna ports of the UE for transmit diversity.

For example, the user equipment with two antenna ports detects the PDCCH in the downlink sub-frame to be fed back to thereby determine that the uplink control channel resources, in the uplink sub-frame for feeding back ACK/NACK with transmit diversity, corresponding to the CCEs occupied by the PDCCH in the downlink sub-frame to be fed back are sufficient for transmit diversity via the two antenna ports, and then the uplink control resources corresponding to the CCEs of the control zone in the downlink carrier or the downlink sub-frame to be fed back are used as feedback channels over which ACK/NACK is fed back via both of the antenna ports of the UE for transmit diversity.

In a second scenario, if the base station determines from the PDCCH in the downlink sub-frame to be fed back that the uplink control channel resources, in the uplink sub-frame for feeding back ACK/NACK with transmit diversity, corresponding to the CCEs occupied by the PDCCH in the downlink sub-frame to be fed back are insufficient for transmit diversity via two antenna ports, it determines ACK/NACK feedbacks of the user equipment via the two antenna ports to be received over channel resources in the set of uplink control channel resources and the uplink control resources corresponding to the CCEs occupied by the PDCCH in the downlink sub-frame to be fed back; and then the base station selects from the set of uplink control channel resources, and transmits the indexes of channel resources corresponding to the selected resource elements to the user equipment over the PDCCH of the downlink sub-frame and also signals to the user equipment that the uplink control resources corresponding to the CCEs of the control zone in the downlink sub-frame can be used as feedback channels over which ACK/NACK is fed back; and the user equipment detects the PDCCH in the downlink sub-frame to be fed back to thereby determine that the uplink control channel resources, in the uplink sub-frame for feeding back ACK/NACK with transmit diversity, corresponding to the CCEs occupied by the PDCCH in the downlink sub-frame to be fed back are insufficient for transmit diversity via multiple antenna ports, and then channel resources in the set of uplink control channel resources are used as feedback channels over which ACK/NACK is fed back via a predetermined number M of antenna ports among the multiple antenna ports of the UE for transmit diversity, and the uplink control resources corresponding to the CCEs of the control zone in the downlink carrier or the downlink sub-frame to be fed back are used as feedback channels over which ACK/NACK is fed back via the remaining antenna ports.

For example, the user equipment with two antenna ports detects the PDCCH in the downlink sub-frame to be fed back to thereby determine that the uplink control channel resources, in the uplink sub-frame for feeding back ACK/NACK with transmit diversity, corresponding to the CCEs occupied by the PDCCH in the downlink sub-frame to be fed back are insufficient for transmit diversity via the two antenna ports, and then a channel resource in the set of uplink control channel resources is used as a feedback channel over which ACK/NACK is fed back via a predetermined one of the two antenna ports of the UE for transmit diversity, and an uplink control resource corresponding to a CCE of the control zone in the downlink carrier or the downlink sub-frame to be fed back is used as a feedback channel over which ACK/NACK is fed back via the other antenna port.

According to the foregoing method, processes at the base station and the user equipment are as follows.

Figure 7:
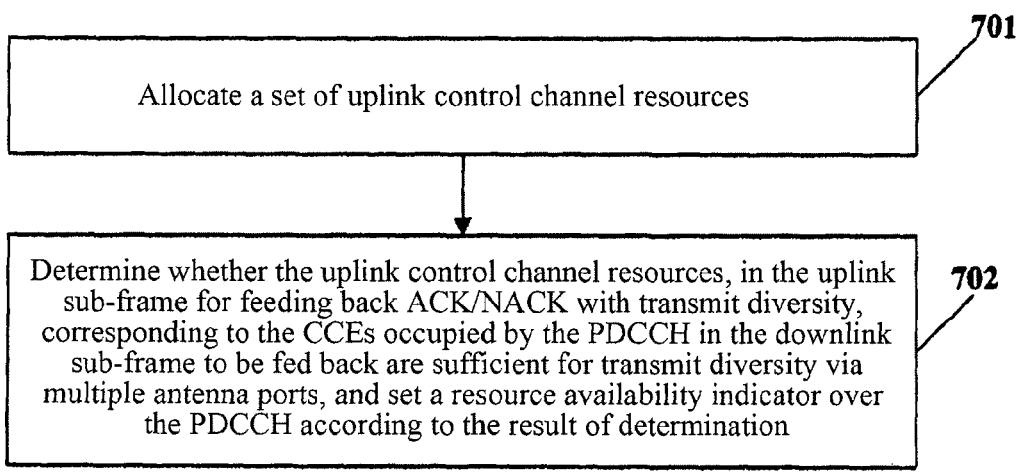
FIG. 7 is a flow chart of a process at a base station according to an embodiment of the invention.

As illustrated in FIG. 7, when the set of uplink control channel resources includes a plurality of resource elements in an application of the method according to the first embodiment, a process at the base station is as follows.

In the step 701, a set of uplink control channel resources is allocated fixedly to the user equipment in high layer RRC signaling, and there are a number N of resource elements in the set, where N is an integer more than or equal to 1, which correspond to a number N of channel resources or groups of channel resources over which ACK/NACK can be fed back. A resource element in the set can be shared by a plurality of user equipments, and the base station schedules the user equipments to give a feedback with time division over the same channel resource to thereby avoid a problem of collision over the channel resource.

Resources in the set of uplink control channel resources are semi-statically configured resources and can be configured in signaling.

In the step 702, it is determined whether the uplink control channel resources, in the uplink sub-frame for feeding back ACK/NACK with transmit diversity, corresponding to the CCEs occupied by the PDCCH in the downlink sub-frame to be fed back are sufficient for transmit diversity via multiple antenna ports, and a resource availability indicator is added over the PDCCH according to the result of determination to indicate whether the user equipment feeds back ACK/NACK over a channel resource in the set of uplink control channel resources and the channel resource index of the channel resource via which ACK/NACK is fed back.

In particular, the resource availability indicator is set in the following scenarios.

In a first scenario, the uplink control channel resources, in the uplink sub-frame for feeding back ACK/NACK with transmit diversity, corresponding to the CCEs occupied by the PDCCH in the downlink sub-frame to be fed back are sufficient for transmit diversity via two antenna ports, that is, the aggregation level of CCEs of PDCCH, in the downlink sub-frame to be fed back, over which a PDSCH of the user equipment is scheduled or an SPS resource is instructed to be released, is more than or equal to the number of antenna ports of the user equipment. In this case, the base station signals to the user equipment over the PDCCH that no resource in the high layer allocated set of uplink control channel resources is used as a feedback channel. This PDCCH signaling method can be performed by newly adding signaling of $\lceil \log_2(N+1) \rceil$ bits to all DCI formats borne over the PDCCH or by encoding the (N+1) signaling statuses jointly with other signaling in the existing Rel-8 DCI format or by even reusing the signaling in the existing DCI format to represent the (N+1) signaling statuses of the resource elements. If signaling of $\lceil \log_2(N+1) \rceil$ bits is newly added to all DCI formats borne over the PDCCH, all the $\lceil \log_2(N+1) \rceil$ bits can be set to zero to indicate that no resource element in the high layer allocated set of resources is used.

In a second scenario, the uplink control channel resources, in the uplink sub-frame for feeding back ACK/NACK with transmit diversity, corresponding to the CCEs occupied by the PDCCH in the downlink sub-frame to be fed back are insufficient for transmit diversity via multiple antenna ports, that is, the aggregation level of CCEs of PDCCH, in the downlink sub-frame to be fed back, over which a PDSCH of the user equipment is scheduled or an SPS resource is instructed to be released, is less than the number of antenna ports of the user equipment. In this case, the base station selects a number M of resource elements from the set of uplink control channel resources allocated to the user equipment as feedback channels over which ACK/NACK is fed back via a number M of antenna ports, and indicates the channel resource indexes of the M resource elements to the user equipment in signaling over the PDCCH and also indicates to the user equipment that the uplink control resources corresponding to the CCEs of the control zone in the downlink sub-frame can be used as feedback channels over which ACK/NACK is fed back. This PDCCH signaling method can be performed by newly adding signaling of $\lceil \log_2(N+1) \rceil$ bits to all DCI formats borne over the PDCCH or by encoding the (N+1) signaling statuses jointly with other signaling in the existing Rel-8 DCI format or by even reusing the signaling in the existing DCI format to represent the (N+1) signaling statuses of the resource elements. If signaling of $\lceil \log_2(N+1) \rceil$ bits is newly added to all DCI formats borne over the PDCCH, the base station indicates the channel resource indexes (starting with 1) of the selected channels in the $\lceil \log_2(N+1) \rceil$ bits, and with N=7, for example, "001" can signal to the user equipment that the first channel resource in the high layer allocated set of resources is used as a feedback channel over which feedback information is fed back to feed back ACK/NACK for a PDSCH over the downlink carrier.

Furthermore, if the set of uplink control channel resources includes only one resource element, the base station transmits, to the user equipment, configuration signaling including information of all the channel resource elements in the set of uplink control channel resources, i.e., the information of the only one resource element.

Then the user equipment detects the PDCCH of the downlink sub-frame to be fed back to determine whether the uplink control channel resources, in the uplink sub-frame for feeding back ACK/NACK with transmit diversity, corresponding to the CCEs occupied by the PDCCH in the downlink sub-frame to be fed back are sufficient for transmit diversity via multiple antenna ports and determines from the result of detection whether to feed back ACK/NACK over the channel resources in the set of uplink control channel resources.

Figure 8:
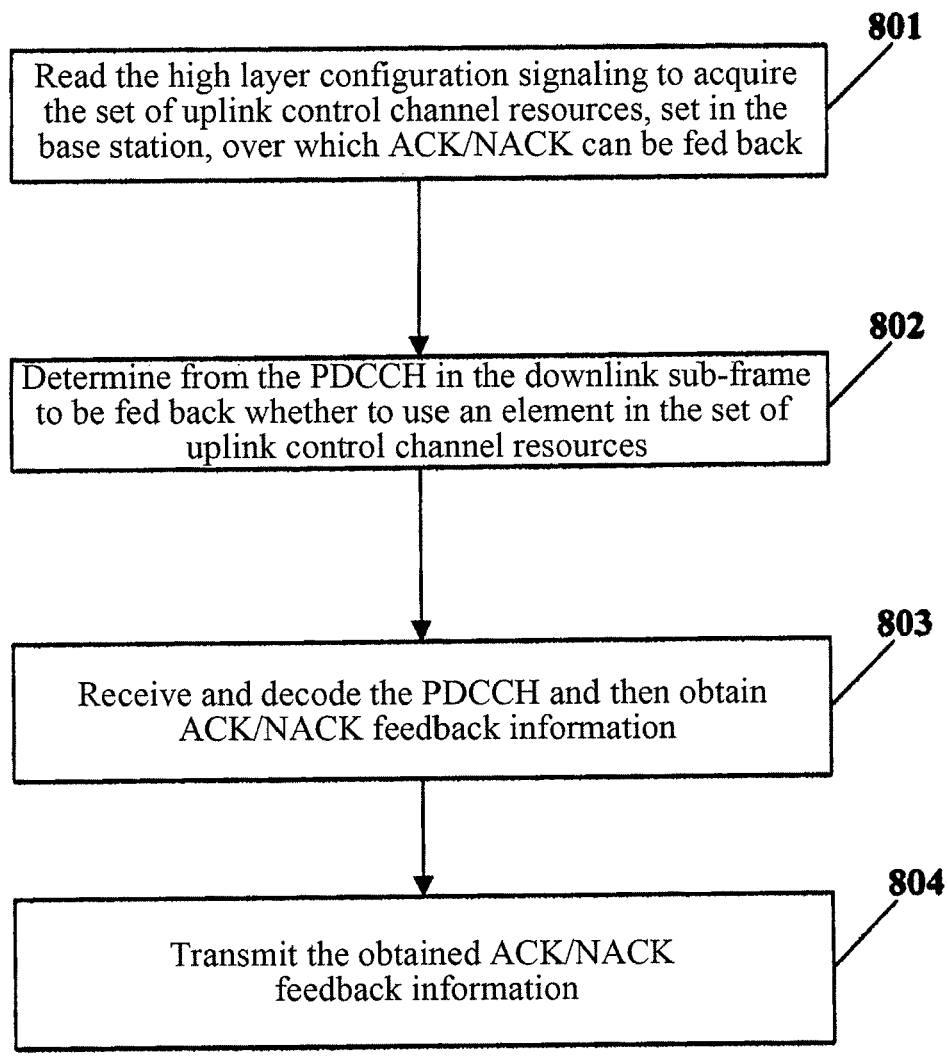
FIG. 8 is a flow chart of a process at a user equipment according to an embodiment of the invention.

As illustrated in FIG. 8, when the set of uplink control channel resources includes at least one channel resource element in an application of the method according to the first embodiment, a process at the user equipment is as follows:

The step 801 is to read the high layer configuration signaling to acquire the set of uplink control channel resources.

The step 802 is to determine from the PDCCH in the downlink sub-frame to be fed back whether to use a resource element in the set of uplink control channel resources.

If signaling of $\lceil \log_2(N+1) \rceil$ bits is newly added to all DCI formats borne over the PDCCH and the user equipment detects the status of all the bits being zero, it indicates that no resource element in the high layer allocated set of resources will be used as a feedback channel. If another status of the bits is detected, it indicates that a resource element in the high layer allocated set of resources will be used as a feedback channel. The user equipment determines from the detected PDCCH the following two scenarios:

No resource element in the set of uplink control channel resources is used. Then the user equipment acquires the indexes of feedback channel resources over which ACK/NACK is fed back via respective antenna ports according to the indicators of a plurality of prescribed CCEs of the PDCCH in the downlink sub-frame to be fed back.

A resource element in the set of uplink control channel resources is used, and then the indexes of channel resources (in the range of the set of uplink control channel resources) over which ACK/NACK is fed back via a preset number M of antenna ports are acquired from the resource elements in the set of uplink control channel resources; and feedback channels corresponding to the remaining antenna ports will be determined from prescribed CCEs of the PDCCH in the downlink sub-frame to be fed back.

The step 803 is to receive and decode the PDCCH and then obtain ACK/NACK feedback information.

The step 804 is to transmit the ACK/NACK feedback information obtained in the step 803 via two antenna ports over the channel resources determined in the step 802.

Furthermore, when the set of uplink control channel resources includes only one resource element, a process of the method at a user equipment is as follows:

When the set of uplink control channel resources includes only one resource element, the base station transmits information of all the channel resource elements in the set of uplink control channel resources to the user equipment, particularly as follows:

The user equipment reads the configuration signaling transmitted from the base station, and when the configuration signaling includes information of only one resource element, then channel resources in the set of uplink control channel resources are used as feedback channels over which ACK/NACK is fed back via a predetermined number M of antenna ports among multiple antenna ports of the UE for transmit diversity, and the uplink control resources corresponding to the CCEs of the control zone in the downlink carrier or the downlink sub-frame to be fed back are used as feedback channels over which ACK/NACK is fed back via the remaining antenna ports.

For example, when there are two antenna ports of the user equipment, if the user equipment detects the control zone in the downlink sub-frame to be fed back to thereby determine that the uplink control channel resources, in the uplink sub-frame for feeding back ACK/NACK with transmit diversity, corresponding to the CCEs occupied by the PDCCH in the downlink sub-frame to be fed back are insufficient for transmit diversity via the two antenna ports, a channel resource in the set of uplink control channel resources is used as a feedback channel over which ACK/NACK is fed back via a predetermined one of the two antenna ports of the UE for transmit diversity, and an uplink control resource corresponding to a CCE of the control zone in the downlink sub-frame to be fed back is used as a feedback channel over which ACK/NACK is fed back via the other antenna port.

The Second Embodiment

When PDCCHs of a downlink sub-frame to be fed back include a PDCCH over which a PUSCH of the user equipment is scheduled, and the method in transmission with transmit diversity via multiple antenna ports is as follows:

In the system, the base station allocates semi-statically and transmits in high layer signaling a set of uplink control channel resources to the user equipment, and there are a number N of resource elements in the set, where N is an integer more than or equal to 1, which correspond to the indexes of N channel resources or groups of channel resources over which ACK/NACK can be fed back. A channel resource element in the set can be shared by a plurality of user equipments, and the base station schedules the user equipments to give a feedback with time division over the same channel resource to thereby avoid a problem of collision over the channel resource.

If the uplink control channel resources, in the uplink sub-frame for feeding back ACK/NACK with transmit diversity, corresponding to the CCEs occupied by the PDCCHs in the downlink sub-frame to be fed back are sufficient for transmit diversity via multiple antenna ports, that is, the number of CCEs, in the downlink sub-frame to be fed back, corresponding to the user equipment is more than or equal to the number of antenna ports, where these CCEs include both CCEs of PDCCH over which a PDSCH of the user equipment is scheduled or an SPS resource is instructed to be released and CCEs of PDCCH over which a PUSCH of the user equipment is scheduled. In this case, all the indexes of channel resources over which ACK/NACK is fed back via the multiple antenna ports are derived from the CCEs corresponding to the user equipment. In this case, it is not necessary to use any resource element in the high layer allocated set of uplink control channel resources; and the base station signals to the user equipment over the PDCCHs that no channel resource element in the high layer allocated set is used. This PDCCH signaling method can be performed by newly adding signaling of $\lceil \log_2(N+1) \rceil$ bits to all DCI formats borne over the PDCCH or by encoding the (N+1) signaling statuses jointly with other signaling in the existing Rel-8 DCI format or by even reusing the signaling in the existing DCI format to represent the (N+1) signaling statuses of the resource elements.

Among the (N+1) signaling statuses, there are a number N of statuses indicating the indexes of channel resources in the set of uplink control channel resources, over which the user equipment can feed back ACK/NACK, and the remaining one status indicating that no channel resource in the set of uplink control channel resources is used via the two antenna ports to feed back ACK/NACK when the user equipment feeds back ACK/NACK with transmit diversity via the two antenna ports.

If the uplink control channel resources, in the uplink sub-frame for feeding back ACK/NACK with transmit diversity, corresponding to the CCEs occupied by the PDCCHs in the downlink sub-frame to be fed back are insufficient for transmit diversity via multiple antenna ports, that is, the number of CCEs, in the downlink sub-frame to be fed back, corresponding to the user equipment is less than the number of antenna ports, where these CCEs include both CCEs of PDCCH over which a PDSCH of the user equipment is scheduled or an SPS resource is instructed to be released and CCEs of PDCCH over which a PUSCH of the user equipment is scheduled. In this case, feedback channels for a predetermined number M of antenna ports are still derived from the CCEs corresponding to the user equipment, and a feedback channel resource element will be selected from the high layer allocated set of uplink control channel resources as feedback channels for the remaining antenna ports. The base station signals the indexes of the channel resources used in the set to the user equipment over the PDCCHs. This PDCCH signaling method can be performed by newly adding signaling of $\lceil \log_2(N+1) \rceil$ bits to all DCI formats borne over the PDCCH or by encoding the (N+1) signaling statuses jointly with other signaling in the existing Rel-8 DCI format or by even reusing the signaling in the existing DCI format to represent the (N+1) signaling statuses of the resource elements.

According to the method according to the second embodiment, a process at the base station is as follows.

In the step 1, a set of uplink control channel resources is allocated fixedly to the user equipment in high layer RRC signaling, and there are a number N of resource elements in the set, which correspond to a number N of channel resources or groups of channel resources over which ACK/NACK can be fed back. A resource element in the set can be shared by a plurality of user equipments, and the base station schedules the user equipments to give a feedback with time division over the same channel resource to thereby avoid a problem of collision over the channel resource.

In the step 2, it is determined whether the uplink control channel resources, in the uplink sub-frame for feeding back ACK/NACK with transmit diversity, corresponding to the CCEs occupied by the PDCCHs in the downlink sub-frame to be fed back are sufficient for transmit diversity via multiple antenna ports, and a resource availability indicator is added over the PDCCHs according to the result of determination.

The uplink control channel resources, in the uplink sub-frame for feeding back ACK/NACK with transmit diversity, corresponding to the CCEs occupied by the PDCCHs in the downlink sub-frame to be fed back are sufficient for transmit diversity via multiple antenna ports, that is, the number of CCEs, in the downlink sub-frame to be fed back, corresponding to the user equipment is more than or equal to the number of antenna ports of the user equipment (these CCEs include both CCEs of PDCCH over which a PDSCH of the user equipment is scheduled or an SPS resource is instructed to be released and CCEs of PDCCH over which a PUSCH of the user equipment is scheduled). In this case, the base station signals to the user equipment over the PDCCHs that no resource in the high layer allocated set of uplink control channel resources is used as a feedback channel. This PDCCH signaling method can be performed by newly adding signaling of $\lceil \log_2(N+1) \rceil$ bits to all DCI formats borne over the PDCCH or by encoding the (N+1) signaling statuses jointly with other signaling in the existing Rel-8 DCI format or by even reusing the signaling in the existing DCI format to represent the (N+1) signaling statuses of the resource elements. If signaling of $\lceil \log_2(N+1) \rceil$ bits is newly added to all DCI formats borne over the PDCCH, all the $\lceil \log_2(N+1) \rceil$ bits can be set to zero to indicate that no resource element in the high layer allocated set of resources is used.

The uplink control channel resources, in the uplink sub-frame for feeding back ACK/NACK with transmit diversity, corresponding to the CCEs occupied by the PDCCHs in the downlink sub-frame to be fed back are insufficient for transmit diversity via two antenna ports, that is, the number of CCEs, in the downlink sub-frame to be fed back, corresponding to the user equipment is less than the number of antenna ports of the user equipment (these CCEs include both CCEs of PDCCH over which a PDSCH of the user equipment is scheduled or an SPS resource is instructed to be released and CCEs of PDCCH over which a PUSCH of the user equipment is scheduled). In this case, the base station selects a number M of resource elements from the set of uplink control channel resources allocated to the user equipment as feedback channels over which ACK/NACK is fed back via a number M of antenna ports, and indicates the indexes of the channel resources to the user equipment in signaling over the PDCCHs. This PDCCH signaling method can be performed by newly adding signaling of $\lceil \log_2(N+1) \rceil$ bits to all DCI formats borne over the PDCCH or by encoding the (N+1) signaling statuses jointly with other signaling in the existing Rel-8 DCI format or by even reusing the signaling in the existing DCI format to represent the (N+1) signaling statuses of the resource elements. If signaling of $\lceil \log_2(N+1) \rceil$ bits is newly added to all DCI formats borne over the PDCCH, the base station indicates the channel resource indexes (starting with 1) of the selected channels in the $\lceil \log_2(N+1) \rceil$ bits, and with N=7, for example, "001" can signal to the user equipment that the first channel resource in the high layer allocated set of resources is used as a feedback channel over which feedback information is fed back to feed back ACK/NACK for a PDSCH over the downlink carrier.

Taking the user equipment with two antenna ports as an example, a process at the user equipment in the method according to the second embodiment is as follows.

The step 1 is to read the high layer configuration signaling to acquire the set of uplink control channel resources.

The step 2 is to detect the PDCCHs in the downlink sub-frame to be fed back and to determine whether to use a resource element in the set of uplink control channel resources. For example, if signaling of $\lceil \log_2(N+1) \rceil$ bits is newly added to all DCI formats borne over the PDCCH and the user equipment detects the status of all the bits being zero, it indicates that no resource element in the high layer allocated set of resources will be used as a feedback channel. If another status of the bits is detected, it indicates that a resource element in the high layer allocated set of resources will be used as a feedback channel. The user equipment determines from the detected PDCCHs the following two scenarios:

In a first scenario, no resource element in the set of uplink control channel resources is used. In this case, the user equipment acquires the indexes of feedback channel resources over which ACK/NACK is fed back via the two antenna ports according to the indicators of two CCEs (including both CCEs of PDCCH over which a PDSCH of the user equipment is scheduled or an SPS resource is instructed to be released and CCEs of PDCCH over which a PUSCH of the user equipment is scheduled) prescribed by the user equipment in the downlink sub-frame to be fed back.

In a second scenario, a resource element in the set of uplink control channel resources is used. In this case, the index of a channel resource (in the range of the set of uplink control channel resources) over which ACK/NACK is fed back via one of the antenna ports is acquired according to the indicator over the PDCCHs; and a feedback channel corresponding to the other antenna port will be determined from the indicator of a CCE (including both CCEs of PDCCH over which a PDSCH of the user equipment is scheduled or an SPS resource is instructed to be released and CCEs of PDCCH over which a PUSCH of the user equipment is scheduled) prescribed by the user equipment in the downlink carrier or the downlink sub-frame to be fed back.

The step 3 is to receive and decode the PDCCHs and then obtain ACK/NACK feedback information.

The step 4 is to transmit the ACK/NACK feedback information obtained in the step 3 via the two antenna ports over the channel resources determined in the step 2.

In the method according to the second embodiment, there are also two scenarios in which there is only one and at least two resource elements respectively in the set of uplink control channel resources, and processes at the user equipment and the base station in this embodiment are the same as those in the first embodiment, so a repeated description thereof will be omitted here.

Figure 9:
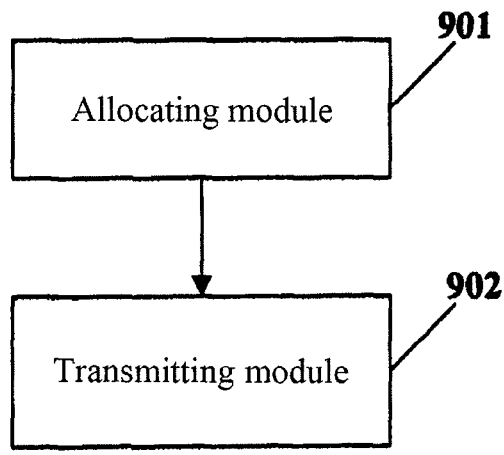
FIG. 9 is a schematic structural diagram of a device for configuring an uplink control channel resource according to an embodiment of the invention.

As illustrated in FIG. 9, an embodiment of the invention provides a resource configuring device which can be a network device, e.g., a base station, and which includes:

an allocating module 901 configured to determine an uplink control channel resource over which a user equipment feeds back ACK/NACK; and a transmitting module 902 configured to transmit configuration signaling to the user equipment to indicate the uplink control channel resource over which the user equipment feeds back ACK/NACK, where the uplink control channel resource includes a channel resource in a set of uplink control channel resources and/or an uplink control channel resource corresponding to a CCE occupied by a downlink control channel to be fed back, and the set of uplink control channel resources includes one or more channel resource elements over which ACK/NACK can be fed back.

Figure 10:
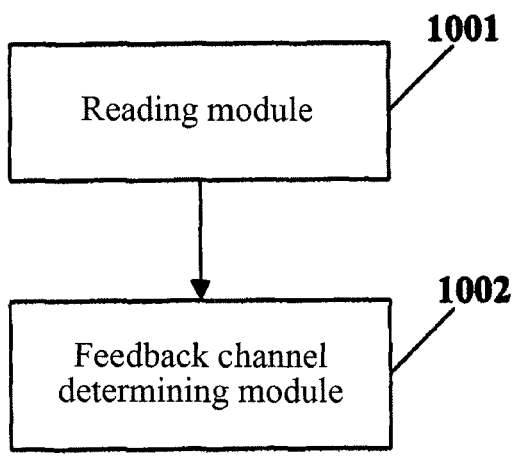
FIG. 10 is a schematic structural diagram of another device for configuring an uplink control channel resource according to an embodiment of the invention.

As illustrated in FIG. 10, an embodiment of the invention further provides a resource configuring device which can be a device, e.g., a user equipment, and which includes:

a reading module 1001 configured to receive configuration signaling transmitted from a base station; and a feedback channel determining module 1002 configured to feed back ACK/NACK over a corresponding channel resource according to the configuration signaling transmitted from the base station, where the configuration signaling is determined by the base station according to conditions of channel resource elements included in a preset set of uplink control channel resources and/or the number of uplink control channel resources corresponding to CCEs occupied by a downlink control channel to be fed back, and the set of uplink control channel resources includes one or more channel resource elements over which ACK/NACK can be fed back.

The invention presents a dynamic and semi-static resource allocating method which is simple and easy to implement and applicable to both FDD and TDD systems. For PUCCH transmission with transmit diversity, the method of the invention can also remove the limitation on the aggregation level of CCEs of downlink control channels (PDCCHs) corresponding to a user equipment, can ensure the flexibility of and lower the complexity of a system while improving the reliability of the system due to a gain of transmit diversity and can be well compatible with an LTE Release 8 system.

Those skilled in the art shall appreciate that the embodiments of the invention can be embodied as a method, system or computer program product. Therefore, the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for configuring an uplink control channel resource, comprising:
    determining, by a base station, an uplink control channel resource over which a user equipment feeds back ACK/NACK; and
    transmitting, by the base station, configuration signaling to the user equipment to indicate the uplink control channel resource over which the user equipment feeds back ACK/NACK, wherein the uplink control channel resource comprises a channel resource selected from a set of uplink control channel resources and/or an uplink control channel resource corresponding to a Control Channel Element, CCE, occupied by a downlink control channel to be fed back, and the set of uplink control channel resources comprises one or more channel resource elements over which ACK/NACK can be fed back;

wherein transmitting the configuration signaling to the user equipment comprises:

setting, by the base station, a resource availability indicator over a Physical Downlink Control Channel, PDCCH, according to the number of uplink control channel resources corresponding to CCEs occupied by the downlink control channel to be fed back;

wherein if the set of uplink control channel resources comprises a number N of resource elements corresponding to a number N of channel resources or groups of channel resources over which the user equipment can feed back ACK/NACK, and a corresponding channel resource index is set in correspondence to each resource element, wherein N is an integer more than or equal to 1, and then adding the resource availability indicator over the Physical Downlink Control Channel, PDCCH, comprises:

adding signaling of $\lceil \log_2(N+1) \rceil$ bits to all DCI formats borne over the PDCCH, and among a number N+1 of statuses indicated in the signaling, there are a number N of statuses indicating the channel resource indexes of elements in the set of uplink control channel resources, over which the user equipment can feed back ACK/NACK and the remaining one status indicating that ACK/NACK is fed back over the uplink control channel resources corresponding to the CCEs occupied by the downlink control channel when the user equipment feeds back ACK/NACK with transmit diversity;

or encoding signaling of $\lceil \log_2(N+1) \rceil$ bits jointly with other signaling in a DCI format to thereby add the resource availability indicator over the Physical Downlink Control Channel, PDCCH; or reusing signaling in a DCI format to represent the N+1 statuses to thereby add the resource availability indicator over the Physical Downlink Control Channel, PDCCH;

wherein among the N+1 of statuses, there are a number N of statuses indicating the channel resource indexes of elements in the set of uplink control channel resources, over which the user equipment can feed back ACK/NACK and the remaining one status indicating that ACK/NACK is fed back over the uplink control channel resources corresponding to the CCEs occupied by the downlink control channel when the user equipment feeds back ACK/NACK with transmit diversity.

2. The method according to claim 1, wherein if the base station determines that the number of uplink control channel resources, in an uplink sub-frame for feeding back ACK/NACK with transmit diversity, corresponding to the CCEs occupied by the downlink control channel to be fed back is not less than the number of antenna ports used for transmit diversity, the resource availability indicator indicates that the uplink control channel resources corresponding to the CCEs occupied by the downlink control channel are used for the multiple antenna ports when the user equipment feeds back ACK/NACK with transmit diversity.

3. The method according to claim 1, wherein when the set of uplink control channel resources comprises at least two resource elements, if the base station determines that the number of uplink control channel resources, in an uplink sub-frame for feeding back ACK/NACK with transmit diversity, corresponding to the CCEs occupied by the downlink control channel to be fed back is less than the number of antenna ports used for transmit diversity, the resource availability indicator indicates that the uplink control channel resources corresponding to the CCEs occupied by the downlink control channel to be fed back can be used, when feeding back ACK/NACK with transmit diversity via the multiple antenna ports, and indicates the used channel resource indexes in the set of uplink control channel resources for a preset number M of antenna ports, wherein M is an integer more than 1 and less than the number of antenna ports.

4. The method according to claim 1, wherein when the set of uplink control channel resources comprises only one resource element, if the base station determines that the number of uplink control channel resources, in an uplink sub-frame for feeding back ACK/NACK with transmit diversity, corresponding to the CCEs occupied by the downlink control channel to be fed back is less than the number of antenna ports used for transmit diversity, the base station transmits to the user equipment the configuration signaling comprising the resource availability indicator indicating that the uplink control channel resources corresponding to the CCEs occupied by the downlink control channel to be fed back can be used, when feeding back ACK/NACK with transmit diversity via the multiple antenna ports, and indicating information of the only one resource element comprised in the set of uplink control channel resources.

5. The method according to claim 1, wherein a plurality of user equipments share a resource element in the set of uplink control channel resources, and the base station schedules the user equipments to feed back with time division over the same channel resource.

6. The method according to claim 1, wherein the CCE occupied by the downlink control channel to be fed back comprises a CCE of a Physical Downlink Control Channel, PDCCH, over which a Physical Downlink Shared Channel, PDSCH, of the user equipment is scheduled and/or a CCE of a PDCCH over which a Physical Uplink Shared Channel, PUSCH, of the user equipment is scheduled and/or a CCE of a PDCCH over which an Semi-Persistent Scheduling, SPS, resource is released.

7. The method according to claim 1, wherein the set of uplink control channel resources is configured by and transmitted from the base station to the user equipment.

8. A method for configuring an uplink control channel resource, comprising:

receiving, by a user equipment, configuration signaling transmitted from a base station;

acquiring, by the user equipment, a set of uplink control channel resources according to the configuration signaling transmitted from the base station; and feeding back, by the user equipment, ACK/NACK over a corresponding channel resource according to a Physical Downlink Control Channel, PDCCH, in a downlink sub-frame to be fed back, wherein the configuration signaling is determined by the base station according to channel resource elements comprised in a preset set of uplink control channel resources and/or uplink control channel resources corresponding to Control Channel Elements, CCEs, occupied by a downlink control channel to be fed back, and the set of uplink control channel resources comprises one or more channel resource elements over which ACK/NACK can be fed back;

wherein there is a resource availability indicator over the PDCCH in the downlink sub-frame to be fed back, set by the base station according to a number of uplink control channel resources corresponding to CCEs occupied by the downlink control channel to be fed back;

wherein if the set of uplink control channel resources comprises a number N of resource elements corresponding to a number N of channel resources or groups of channel resources over which the user equipment can feed back ACK/NACK, and a corresponding channel resource index is set in correspondence to each resource element, wherein N is an integer more than or equal to 1, and then the resource availability indicator over the PDCCH is set by the base station by:

adding signaling of $\lceil \log_2(N+1) \rceil$ bits to all DCI formats borne over the PDCCH, and among a number N+1 of statuses indicated in the signaling, there are a number N of statuses indicating the channel resource indexes of elements in the set of uplink control channel resources, over which the user equipment can feed back ACK/NACK and the remaining one status indicating that ACK/NACK is fed back over the uplink control channel resources corresponding to the CCEs occupied by the downlink control channel when the user equipment feeds back ACK/NACK with transmit diversity;

or encoding signaling of $\lceil \log_2(N+1) \rceil$ bits jointly with other signaling in a DCI format to thereby add the resource availability indicator over the Physical Downlink Control Channel, PDCCH; or reusing signaling in a DCI format to represent the N+1 statuses to thereby add the resource availability indicator over the Physical Downlink Control Channel, PDCCH;

wherein among the N+1 of statuses, there are a number N of statuses indicating the channel resource indexes of elements in the set of uplink control channel resources, over which the user equipment can feed back ACK/NACK and the remaining one status indicating that ACK/NACK is fed back over the uplink control channel resources corresponding to the CCEs occupied by the downlink control channel when the user equipment feeds back ACK/NACK with transmit diversity.

9. The method according to claim 8, wherein feeding back by the user equipment ACK/NACK over the corresponding channel resource according to the configuration signaling transmitted from the base station comprises:

when the configuration signaling comprises an indicator that no channel resource element comprised in the set of uplink control channel resources is used, the user equipment transmitting with diversity over the uplink control channel resources corresponding to the CCEs occupied by the downlink control channel to be fed back.

10. The method according to claim 8, wherein feeding back by the user equipment ACK/NACK over the corresponding channel resource according to the configuration signaling transmitted from the base station comprises:

when the configuration signaling comprises an indicator that the uplink control channel resources corresponding to the CCEs occupied by the downlink control channel to be fed back are used and the channel resource indexes of resource elements used in the set of uplink control channel resources for a preset number M of antenna ports, feeding back ACK/NACK over feedback channels which are channel resources in the set of uplink control channel resources corresponding to the channel resource indexes in the configuration signaling, via the preset number M of antenna ports among multiple antenna ports of the UE for transmit diversity, and over feedback channels which are the uplink control channel resources corresponding to the CCEs occupied by the downlink control channel to be fed back, via the remaining antenna ports.

11. The method according to claim 8, wherein feeding back by the user equipment ACK/NACK over the corresponding channel resource according to the configuration signaling transmitted from the base station comprises: when the configuration signaling comprises information of one resource element, feeding back ACK/NACK over feedback channels which are channel resources in the set of uplink control channel resources corresponding to channel resource indexes in the configuration signaling, via predetermined antenna ports among multiple antenna ports of the UE for transmit diversity, and over feedback channels which are the uplink control channel resources corresponding to the CCEs occupied by the downlink control channel to be fed back, via the remaining antenna ports.

12. The method according to claim 8, wherein the set of uplink control channel resources is configured by and transmitted from the base station to the user equipment.

13. The method according to claim 8, wherein the CCEs occupied by the downlink control channel to be fed back comprise a CCE of a Physical Downlink Control Channel, PDCCH, over which a Physical Downlink Shared Channel, PDSCH, of the user equipment is scheduled and/or a CCE of a PDCCH over which a Physical Uplink Shared Channel, PUSCH, of the user equipment is scheduled and/or a CCE of a PDCCH over which an Semi-Persistent Scheduling, SPS, resource is released.

14. A device for configuring an uplink control channel resource, comprising:

an allocating module configured to determine an uplink control channel resource over which a user equipment feeds back ACK/NACK; and a transmitting module configured to transmit configuration signaling to the user equipment to indicate the uplink control channel resource over which the user equipment feeds back ACK/NACK, wherein the uplink control channel resource comprises a channel resource in a set of uplink control channel resources and/or an uplink control channel resource corresponding to a Control Channel Element, CCE, occupied by a downlink control channel to be fed back, and the set of uplink control channel resources comprises one or more channel resource elements over which ACK/NACK can be fed back;

wherein the transmitting module configured to transmit the configuration signaling to the user equipment is further configured:

to set a resource availability indicator over a Physical Downlink Control Channel, PDCCH, according to the number of uplink control channel resources corresponding to CCEs occupied by the downlink control channel to be fed back;

wherein if the set of uplink control channel resources comprises a number N of resource elements corresponding to a number N of channel resources or groups of channel resources over which the user equipment can feed back ACK/NACK, and a corresponding channel resource index is set in correspondence to each resource element, wherein N is an integer more than or equal to 1, and then the transmitting module configured to add the resource availability indicator over the PDCCH is further configured:

to add signaling of $\lceil \log_2(N+1) \rceil$ bits to all DCI formats borne over the PDCCH, and among a number N+1 of statuses indicated in the signaling, there are a number N of statuses indicating the channel resource indexes of elements in the set of uplink control channel resources, over which the user equipment can feed back ACK/NACK and the remaining one status indicating that ACK/NACK is fed back over the uplink control channel resources corresponding to the CCEs occupied by the downlink control channel when the user equipment feeds back ACK/NACK with transmit diversity;

or to encode signaling of $\lceil \log_2(N+1) \rceil$ bits jointly with other signaling in a DCI format to thereby add the resource availability indicator over the PDCCH; or to reuse signaling in a DCI format to represent the N+1 statuses to thereby add the resource availability indicator over the PDCCH;

wherein among the N+1 of statuses, there are a number N of statuses indicating the channel resource indexes of elements in the set of uplink control channel resources, over which the user equipment can feed back ACK/NACK and the remaining one status indicating that ACK/NACK is fed back over the uplink control channel resources corresponding to the CCEs occupied by the downlink control channel when the user equipment feeds back ACK/NACK with transmit diversity.

* * * * *